(12) United States Patent
Fukui et al.

(10) Patent No.: US 11,189,430 B2
(45) Date of Patent: Nov. 30, 2021

(54) ELECTROLYTIC CAPACITOR AND METHOD FOR PRODUCING SAME

(71) Applicant: Panasonic Intellectual Property Management Co., Ltd., Osaka (JP)

(72) Inventors: Hitoshi Fukui, Nara (JP); Hiroshi Kojima, Aichi (JP); Ai Makino, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/618,134

(22) PCT Filed: May 7, 2018

(86) PCT No.: PCT/JP2018/017579
§ 371 (c)(1),
(2) Date: Nov. 28, 2019

(87) PCT Pub. No.: WO2018/235434
PCT Pub. Date: Dec. 27, 2018

(65) Prior Publication Data
US 2020/0168404 A1 May 28, 2020

(30) Foreign Application Priority Data

Jun. 22, 2017 (JP) .............................. JP2017-122579

(51) Int. Cl.
*H01G 9/028* (2006.01)
*H01G 9/00* (2006.01)

(52) U.S. Cl.
CPC ........... *H01G 9/028* (2013.01); *H01G 9/0036* (2013.01)

(58) Field of Classification Search
None
See application file for complete search history.

(56) References Cited

U.S. PATENT DOCUMENTS

| | | | | |
|---|---|---|---|---|
| 2008/0248313 A1* | 10/2008 | Seshadri | ................ | H01G 11/56 428/419 |
| 2010/0103590 A1* | 4/2010 | Saida | ................... | C08G 61/126 361/525 |
| 2012/0073027 A1* | 3/2012 | Martin | ............... | C08G 65/3344 2/69 |

(Continued)

FOREIGN PATENT DOCUMENTS

| | | |
|---|---|---|
| CN | 101203925 A | 6/2008 |
| JP | 2007-110074 | 4/2007 |

(Continued)

OTHER PUBLICATIONS

International Search Report of PCT application No. PCT/JP2018/017579 dated Jul. 17, 2018.

(Continued)

*Primary Examiner* — Dion Ferguson
(74) *Attorney, Agent, or Firm* — McDermott Will and Emery LLP

(57) ABSTRACT

An electrolytic capacitor includes an anode body, a dielectric layer disposed on the anode body, and a solid electrolyte layer disposed on the dielectric layer. The solid electrolyte layer includes a self-doped conductive polymer and an organic alkali.

7 Claims, 1 Drawing Sheet

(56) References Cited

U.S. PATENT DOCUMENTS

| | | | | |
|---|---|---|---|---|
| 2014/0014881 A1* | 1/2014 | Takeda | ............... | H01B 1/122 |
| | | | | 252/500 |
| 2014/0328007 A1* | 11/2014 | Endo | ............... | H01G 9/0036 |
| | | | | 361/528 |
| 2015/0255221 A1* | 9/2015 | Asteman | ............ | H01G 9/0036 |
| | | | | 361/528 |
| 2018/0005759 A1* | 1/2018 | Uka | ............... | H01G 9/0036 |
| 2018/0208713 A1* | 7/2018 | Scheel | ............... | H01G 9/15 |
| 2019/0287729 A1* | 9/2019 | Fukui | ............... | H01G 9/028 |
| 2020/0082994 A1* | 3/2020 | Fukui | ............... | H01G 9/0036 |

FOREIGN PATENT DOCUMENTS

| | | | | |
|---|---|---|---|---|
| JP | 2016-102190 | 6/2016 | | |
| WO | 2013/081099 | 6/2013 | | |
| WO | WO2016157769 | * 10/2016 | ............ | H01G 9/028 |

OTHER PUBLICATIONS

English Translation of Chinese Office Action dated Jan. 18, 2021 for the related Chinese Patent Application No. 201880040320.6.

* cited by examiner

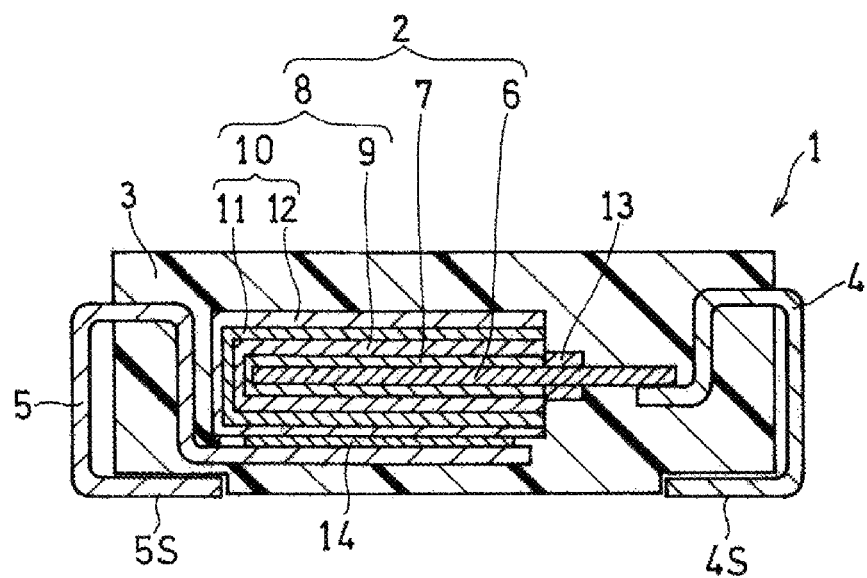

ELECTROLYTIC CAPACITOR AND METHOD FOR PRODUCING SAME

This application is a U.S. national stage application of the PCT International Application No. PCT/JP2018/017579 filed on May 7, 2018, which claims the benefit of foreign priority of Japanese patent application No. 2017-122579 filed on Jun. 22, 2017, the contents all of which are incorporated herein by reference.

TECHNICAL FIELD

As capacitors having a small size, a large capacitance, and a low equivalent series resistance (ESR), promising candidates are electrolytic capacitors including an anode body, a dielectric layer disposed on the anode body, and a solid electrolyte layer containing a conductive polymer, which is disposed on the dielectric layer.

Unexamined Japanese Patent Publication No. 2007-110074 proposes a solid electrolytic capacitor that includes a conductive polymer layer containing a self-doped conductive polymer having an isothianaphthene skeleton. International Publication No. 2013/081099 proposes a solid electrolytic capacitor that includes an amine-containing layer and a conductive polymer layer containing a self-doped conductive polymer such as polyanilinesulfonic acid or poly(isothianaphthenediyl-sulfonate).

SUMMARY

Formation of a solid electrolyte layer containing a self-doped conductive polymer sometimes causes an increase of the ESR in high-temperature environments and a decrease of withstand voltage characteristics.

One aspect of the present invention relates to an electrolytic capacitor. The electrolytic capacitor includes an anode body, a dielectric layer disposed on the anode body, and a solid electrolyte layer disposed on the dielectric layer. The solid electrolyte layer includes a self-doped conductive polymer and an organic alkali.

Another aspect of the present invention relates to a method for manufacturing an electrolytic capacitor. The method includes steps of: preparing an anode body on which a dielectric layer is formed; preparing a liquid composition including a self-doped conductive polymer and an organic alkali; and forming a solid electrolyte layer by attaching the liquid composition onto the dielectric layer. The solid electrolyte layer includes the self-doped conductive polymer and the organic alkali.

According to the present invention, there can be provided an electrolytic capacitor capable of maintaining a low ESR even in high-temperature environments, and a method for manufacturing the electrolytic capacitor.

BRIEF DESCRIPTION OF DRAWING

FIG. 1 is a schematic sectional view illustrating an electrolytic capacitor according to one exemplary embodiment of the present invention.

DESCRIPTION OF EMBODIMENTS

[Electrolytic Capacitor]

An electrolytic capacitor according to an exemplary embodiment of the present invention includes an anode body, a dielectric layer disposed on the anode body, and a solid electrolyte layer disposed on the dielectric layer.

(Solid Electrolyte Layer)

In the present exemplary embodiment, the solid electrolyte layer includes a conductive polymer and an organic alkali, and the conductive polymer includes a self-doped conductive polymer (first conductive polymer).

The self-doped conductive polymer refers to a conductive polymer having an anionic group directly or indirectly bonded to a conductive polymer skeleton by covalent bonding. This anionic group owned by the conductive polymer functions as a dopant of the conductive polymer. Thus, the conductive polymer is referred to as self-doped. The anionic group includes, for example, an acidic group (acid type) or a conjugated-anion group (salt type) of the acidic group. Hence, the solid electrolyte layer formed using the self-doped conductive polymer is likely to have acidity to cause the dielectric layer to be corroded. The corrosion of the dielectric layer sometimes causes to decline the withstand voltage characteristics or to raise the ESR. It is possible to suppress the corrosion of the dielectric layer to some extent by adding ammonia to a solid electrolyte layer. However, when the electrolytic capacitor is exposed to high-temperature environments for a long period, a morphology of the solid electrolyte layer would change to cause the ESR rise.

In contrast, by adding an organic alkali to a solid electrolyte layer including a self-doped conductive polymer, the rise of the ESR can be suppressed even when the electrolytic capacitor is exposed to high-temperature environments for a long period. Further, by adding the organic alkali to the solid electrolyte layer, the corrosion of the dielectric layer caused by a dopant contained in the solid electrolyte layer can be suppressed. Thus, high withstand voltage characteristics of the electrolytic capacitor can be secured. This is considered to be because the organic alkali is less likely to be volatilized than ammonia. This suppresses the change in the morphology of the solid electrolyte layer even when the electrolytic capacitor is exposed to high-temperature environments for a long period. Hence, spread of conductive paths is maintained, and an increase in interface resistance between the solid electrolyte layer and a layer adjacent to the solid electrolyte layer is suppressed.

Examples of the anionic group, which the first conductive polymer has, include a sulfonate group, a carboxy group, a phosphate group, a phosphonate group, and salts of these groups (e.g., a salt with an inorganic base and a salt with an organic base). The first conductive polymer may have one type of anionic group, and may also have two or more types of anionic groups. As the anionic group, a sulfonate group or a salt of the sulfonate group is preferred. Further, a sulfonate group or a salt of the sulfonate group may be combined with an anionic group other than the sulfonate group or the salt of the sulfonate group. As for a content of the anionic group in the first conductive polymer, a number of the anionic group per one molecule corresponding to a main skeleton of the first conductive polymer ranges preferably from 1 to 3, inclusive, further preferably 1 or 2 (particularly 1), for example.

As the first conductive polymer, for example, polypyrrole having an anionic group, polythiophene having an anionic group, and polyaniline having an anionic group are preferred, for example. These conductive polymers may be used alone or in combination of two or more types of conductive polymers. Further, the first conductive polymer may be a copolymer of two or more types of monomers. In the present specification, polypyrrole, polythiophene, polyaniline, and the like mean polymers having, as a basic skeleton, polypyrrole, polythiophene, polyaniline, and the like, respectively. Therefore, polypyrrole, polythiophene, polyaniline, and the like can also include derivatives (e.g., substitution products having an anionic group together with a substituent other than the anionic group) of polypyrrole, polythiophene, polyaniline, and the like, respectively. For example, the polythiophene includes poly(3,4-ethylenedioxythiophene) (PEDOT) and the like. Among these conductive polymers, self-doped PEDOT-based conductive polymers (PEDOT and a derivative of PEDOT) and self-doped poly(isothianaphthene)-based conductive polymers (poly (isothianaphthene) and a derivative of poly(isothianaphthene) are preferred, for example, from a viewpoint of obtaining an effect of further suppressing the rise of the ESR in high-temperature environments.

A weight-average molecular weight of the first conductive polymer is not particularly limited, and ranges, for example, from 1,000 to 1,000,000, inclusive.

As the organic alkali, an amine compound is preferred from a viewpoint of improving the withstand voltage characteristics and suppressing the rise of the ESR in high-temperature environments. The amine compound may be any of a primary amine, a secondary amine, and a tertiary amine. The organic alkali may be used alone or in combination of two or more types of organic alkalis. In the solid electrolyte layer, the organic alkali may form a salt with the self-doped conductive polymer and/or a dopant described later. Among the organic alkalis, an aliphatic amine, aromatic amine, and a cyclic amine are preferred, for example, from a viewpoint of facilitating dissolution of the organic alkali in a liquid composition containing the conductive polymer used for forming the solid electrolyte layer and facilitating mixing of the organic alkali with the conductive polymer.

Examples of the aliphatic amine include alkylamines such as ethylamine, diethylamine, triethylamine, N,N-dimethyloctylamine, and N,N-diethyloctylamine; alkanolamines such as ethanolamine, 2-ethylaminoethanol, dimethylaminoethanol, diethanolamine, triethanolamine, and dimethylaminoethoxyethanol; allylamines; and alkylenediamines such as N-ethylethylenediamine and 1,8-diaminooctane. Examples of the aliphatic amine include aminocyclohexane, diaminocyclohexane, and isophoronediamine. Examples of the aromatic amine include aniline and toluidine.

The cyclic amine is preferably a cyclic amine having a five to eight-membered (preferably five or six-membered) nitrogen-containing ring skeleton, such as pyrrole, imidazoline, imidazole, pyrazole, pyridine, pyrazine, pyrimidine or triazine. The cyclic amine may have one nitrogen-containing ring skeleton, or two or more (for example, two or three) nitrogen-containing ring skeletons. When the cyclic amine has two or more nitrogen-containing ring skeletons, the nitrogen-containing ring skeletons may be the same or different. The amine compound may have a substituent as necessary.

From a viewpoint of facilitating maintenance of the morphology of the solid electrolyte layer even when the electrolytic capacitor is exposed to high-temperature environments for a long period, preferred is a secondary amine, and particularly preferred are dialkylamines (particularly di-$C_{1-4}$ alkylamines) such as dimethylamine, diethylamine, and ethylmethylamine.

Whether the solid electrolyte layer contains the amine compound can be examined by, for example, gas chromatography (GC).

The solid electrolyte layer may include a first conductive polymer layer formed on the dielectric layer and containing the first conductive polymer, and a second conductive polymer layer formed on the first conductive polymer layer and containing a second conductive polymer. The second conductive polymer layer may be a single layer or may be formed of a plurality of layers. When the dielectric layer has an area where the first conductive polymer layer is not formed, the second conductive polymer layer may be formed in this area on the dielectric layer.

The first conductive polymer layer may contain a conductive polymer (for example, a non-self-doped conductive polymer) other than the first conductive polymer, but preferably has a large content of the first conductive polymer. A proportion of the first conductive polymer in entire conductive polymers contained in the first conductive polymer layer is, for example, more than or equal to 90% by mass and may also be 100% by mass.

Although the first conductive polymer has the anionic group, the first conductive polymer layer may further include a dopant as necessary. As the dopant, an anion and/or a polyanion may be used, for example. In the first conductive polymer layer, the anion and/or the polyanion may form a conductive polymer complex with the conductive polymer. In the present specification, the conductive polymer complex refers to the conductive polymer doped with the anion and/or the polyanion, or the conductive polymer to which the anion is bonded or the conductive polymer to which the polyanion is bonded through an anionic group of the polyanion.

Examples of the anion include a sulfate ion, a nitrate ion, a phosphate ion, a borate ion, and an organic sulfonate ion, but the anion is not particularly limited. The anion in a salt form may be included in the first conductive polymer layer.

The polyanion has an anionic group such as a sulfonate group, a carboxy group, a phosphate group, a phosphonate group, and salts of these groups. The polyanion may have one type of anionic group or two or more types of anionic groups. As the anionic group, a sulfonate group or a salt of the sulfonate group is preferred. Further, a sulfonate group or a salt of the sulfonate group may be combined with an anionic group other than the sulfonate group or the salt of the sulfonate group. Examples of the polyanion include polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), polyisoprenesulfonic acid, polyacrylic acid, and salts of these acids. These polyanions may be used alone or in combination of two or more types of polyanions. These polyanions may be a homopolymer or a copolymer of two or more types of monomers. Particularly, polystyrenesulfonic acid (PSS) is preferred.

A weight-average molecular weight of the polyanion ranges, for example, from 1000 to 1,000,000, inclusive.

A content ratio of the dopant to the first conductive polymer layer ranges, for example, from 0 parts by mass to 50 parts by mass, inclusive, with respect to 100 parts by mass of the first conductive polymer. Preferably, the content ratio of the dopant to the first conductive polymer layer ranges from 0 parts by mass to 10 parts by mass, inclusive, or preferably from 0.1 parts by mass to 10 parts by mass, inclusive, with respect to 100 parts by mass of the first conductive polymer.

In the present exemplary embodiment, the organic alkali is preferred to be uniformly distributed in at least the first conductive polymer layer (preferably in the solid electrolyte layer), from a viewpoint of suppressing the morphology change of the solid electrolyte layer. For example, the distribution of the organic alkali preferably has small variation between an inner portion of the first conductive polymer layer and a portion in a vicinity of a surface of the first conductive polymer layer. Such variation in the distribution of the organic alkali can be evaluated by the following method. A section of the solid electrolyte layer is subjected to elementary analysis with, for example, an electron probe micro analyzer (EPMA) or energy dispersive X-ray spectrometry (EDX). And distribution quantities of a nitrogen element contained in the organic alkali (specifically, a nitrogen element of the amine compound) are measured in a portion around a center along a thickness direction of the first conductive polymer layer and a portion around a surface (surface opposite from the dielectric layer) of the first conductive polymer layer. And the variation in the distribution of the organic alkali is evaluated by comparing the distribution quantity in the portion around the center and the distribution quantity the portion around the surface.

As the second conductive polymer, a conductive polymer different from the first conductive polymer is usually used. And a non-self-doped conductive polymer is preferred as the second conductive polymer. The non-self-doped conductive polymer refers to a conductive polymer having no anionic group (specifically, a sulfonate group, a carboxy group, a phosphate group, a phosphonate group, and salts of these groups) directly or indirectly bonded to a conductive polymer skeleton by covalent bonding.

As the non-self-doped conductive polymer, polypyrrole, polythiophene, and polyaniline are preferred, for example. These non-self-doped conductive polymers may be used alone or in combination of two or more types of non-self-doped conductive polymers. Further, the non-self-doped conductive polymer may be a copolymer of two or more types of monomers. Polypyrrole, polythiophene, polyaniline, and the like can also include derivatives (e.g., substitution products having a substituent other than the anionic group) of polypyrrole, polythiophene, polyaniline, and the like, respectively. For example, the polythiophene include PEDOT and the like. Particularly, PEDOT is preferred from a viewpoint of having excellent heat resistance.

A weight-average molecular weight of the second conductive polymer is not particularly limited, and ranges, for example, from 1,000 to 1,000,000, inclusive. When the second conductive polymer layer includes a plurality of layers, the second conductive polymers included in the plurality of layers may be the same or different from each other.

The second conductive polymer layer can further contain a dopant. Used as the dopant is, for example, an anion and/or a polyanion. Each of the anion and the polyanion may be selected from those described for the first conductive polymer layer. The anion or the polyanion may form a conductive polymer complex with the conductive polymer in the second conductive polymer layer.

A content ratio of the dopant to the second conductive polymer layer ranges preferably from 10 parts by mass to 1,000 parts by mass, inclusive, with respect to 100 parts by mass of the second conductive polymer.

The second conductive polymer layer may further contain an alkali as necessary. As the alkali, an inorganic alkali or an organic alkali may be used, for example. Examples of the inorganic alkali include ammonia and metallic hydroxides such as sodium hydroxide and calcium hydroxide. As the organic alkali, the amine compounds exemplified for the first conductive polymer layer are preferred, for example. The alkalis may be used alone or in combination of two or more types of alkalis. From a viewpoint of further increasing the effect of suppressing the rise of the ESR in high-temperature environments, an organic alkali such as an amine compound is preferably used as in the first conductive polymer layer.

The first conductive polymer layer preferably has a smaller thickness than a thickness of the second conductive polymer layer. By such a configuration, the first conductive polymer layer is able to cover as many areas of a surface of the dielectric layer formed along a surface of the anode body (the surface including inner wall surfaces of a pore and a pit of the anode body) as possible. Hence, high heat resistance can be obtained, and high withstand voltage characteristics can be obtained by the formation of the second conductive polymer layer having a large thickness.

The thicknesses of the layers can be measured by an electron micrograph of a section along a thickness direction of the solid electrolyte layer.

The solid electrolyte layer may further contain another component within a range not impairing the effect of the present invention.

The anode body includes, for example, a valve metal or an alloy containing a valve metal. As the valve metal, aluminum, tantalum, niobium, or titanium is preferably used, for example. The valve metal may be used alone or in combination of two or more types of valve metals. The anode body can be obtained by, for example, etching a surface of a base material (such as a foil-shaped or plate-shaped base material) including the valve metal, to roughen the surface. Further, the anode body may be a molded body of particles including the valve metal or a sintered body of the molded body. The sintered body has a porous structure. That is, when the anode body is a sintered body, the anode body can be entirely porous.

The dielectric layer is formed by anodizing through, for example, an anodizing treatment, the valve metal on the surface of the anode body. The dielectric layer contains an oxide of the valve metal. For example, when tantalum is used as the valve metal, the dielectric layer contains $Ta_2O_5$. Further, when aluminum is used as the valve metal, the dielectric layer contains $Al_2O_3$. The dielectric layer is not limited to these examples, and is satisfactory as long as the dielectric layer functions as dielectrics. When the surface of the anode body is porous, the dielectric layer is formed along the surface of the anode body (the surface including inner wall surfaces of a pore and a pit of the anode body).

FIG. 1 is a sectional view schematically illustrating a structure of an electrolytic capacitor according to one exemplary embodiment of the present invention. As shown in FIG. 1, electrolytic capacitor 1 includes capacitor element 2, resin sealing member 3 for sealing capacitor element 2, and anode terminal 4 and cathode terminal 5 each of which is at least partially exposed to an outside of resin sealing member 3. Anode terminal 4 and cathode terminal 5 can be formed of, for example, a metal such as copper or a copper alloy. Resin sealing member 3 has a substantially rectangular parallelepiped outer shape, and electrolytic capacitor 1 also has a substantially rectangular parallelepiped outer shape. As a material for resin sealing member 3, for example, an epoxy resin can be used.

Capacitor element 2 includes anode body 6, dielectric layer 7 covering anode body 6, and cathode part 8 covering dielectric layer 7. Cathode part 8 includes solid electrolyte layer 9 that covers dielectric layer 7 and cathode lead-out layer 10 that covers solid electrolyte layer 9. Cathode lead-out layer 10 includes carbon layer 11 and silver paste layer 12.

Anode body 6 includes an area opposed to cathode part 8 and an area that is not opposed to cathode part 8. In the area of anode body 6 that is not opposed to cathode part 8, insulating separation layer 13 is formed so as to zonally cover a surface of anode body 6 in a portion adjacent to cathode part 8, thereby regulating contact between cathode part 8 and anode body 6. In the area of anode body 6 that is not opposed to cathode part 8, another portion is electrically connected to anode terminal 4 by welding. Cathode terminal 5 is electrically connected to cathode part 8 via adhesive layer 14 made of a conductive adhesive.

As anode body 6, a base material (such as a foil-shaped or plate-shaped base material) containing a valve metal whose surface is roughened is used. For example, an aluminum foil whose surface is roughened by etching is used. Dielectric layer 7 contains, for example, an aluminum oxide such as $Al_2O_3$.

Main surface 4S of anode terminal 4 and main surface 5S of cathode terminal 5 are exposed from a same surface of resin sealing member 3. These exposed surfaces are used for solder connection with a substrate (not shown) on which electrolytic capacitor 1 is to be mounted.

Carbon layer 11 is satisfactory as long as the carbon layer has conductivity, and the carbon layer can be formed using, for example, a conductive carbon material such as graphite. For silver paste layer 12, for example, a composition containing a silver powder and a binder resin (such as an epoxy resin) can be used. A configuration of cathode lead-out layer 10 is not limited to this example, and is satisfactory as long as the cathode lead-out layer is configured to have a current collection function.

Solid electrolyte layer 9 is formed so as to cover dielectric layer 7. Solid electrolyte layer 9 does not necessarily cover whole (a whole surface of) dielectric layer 7, and is satisfactory as long as the solid electrolyte layer is formed so as to cover at least a part of dielectric layer 7.

Dielectric layer 7 is formed along the surface (the surface including an inner wall surface of a pore) of anode body 6. A surface of dielectric layer 7 is formed to have an irregular shape corresponding to a shape of the surface of anode body 6. Solid electrolyte layer 9 is preferably formed so as to fill such irregularities of dielectric layer 7.

The electrolytic capacitor according to the present invention is not limited to the electrolytic capacitor having the structure described above, and is applicable to any of variously structured electrolytic capacitors. Specifically, the present invention is also applicable to, for example, a wound electrolytic capacitor and an electrolytic capacitor including a metal powder sintered body as the anode body.

[Method for Manufacturing Electrolytic Capacitor]

A method for manufacturing an electrolytic capacitor according to an exemplary embodiment of the present invention includes: (first step) preparing an anode body on which a dielectric layer is formed; and (second step) forming, on the dielectric layer, a solid electrolyte layer that includes a first conductive polymer and an organic alkali. The second step includes, for example, forming a first conductive polymer layer that includes the first conductive polymer and the organic alkali, by attaching a first liquid composition onto the dielectric layer. The first liquid composition includes the first conductive polymer and the organic alkali. The second step may further include forming a second conductive polymer layer that includes a second conductive polymer, by attaching a second liquid composition onto the first conductive polymer layer. The second liquid composition includes the second conductive polymer or a precursor of the second conductive polymer. The method for manufacturing an electrolytic capacitor may include preparing the anode body prior to the first step. The manufacturing method may also include further forming a cathode lead-out layer.

Hereinafter, the steps are described in more detail.

(Preparing Anode Body)

In this step, an anode body is formed by a publicly known method according to a type of the anode body.

The anode body can be prepared by, for example, roughening a surface of a foil-shaped or plate-shaped base material containing a valve metal. The roughening is satisfactory as long as irregularities can be formed on the surface of the base material, and may be performed by, for example, etching (for example, electrolytic etching) the surface of the base material.

Alternatively, particles of valve metal are prepared and formed into a molded body having a desired shape (for example, a block shape) while one end of a rod-shaped anode lead is embedded in the molded body. This molded body may be sintered to form a porous-structure anode body in which the one end of the anode lead is embedded.

(First Step)

In the first step, a dielectric layer is formed on the anode body. The dielectric layer is formed by anodizing the anode body. The anodizing can be performed by a publicly known method, for example, an anodizing treatment. The anodizing treatment can be performed by, for example, immersing the anode body in an anodizing solution to impregnate a surface of the anode body with the anodizing solution, and applying a voltage between the anode body as an anode and a cathode immersed in the anodizing solution. As the anodizing solution, a phosphoric acid aqueous solution is preferably used, for example.

(Second Step)

In the second step, a solid electrolyte layer is formed so as to cover at least a part of the dielectric layer. The solid electrolyte layer preferably includes at least a first conductive polymer layer including a first conductive polymer and an organic alkali. In this case, at least the first conductive polymer layer is formed in the second step. The first conductive polymer layer is formed by using a first liquid composition including the first conductive polymer and the organic alkali. In the second step, a second conductive polymer layer may further be formed by attaching a second liquid composition onto the first conductive polymer layer after the formation of the first conductive polymer layer. The manufacturing method according to the present exemplary embodiment may include preparing the first liquid composition prior to the forming the first conductive polymer layer. Further, the manufacturing method may also include preparing the second liquid composition prior to the forming the second conductive polymer layer.

(Preparing First Liquid Composition)

In the present step, the first liquid composition is prepared. The first liquid composition includes the first conductive polymer, the organic alkali, and a disperse medium or a solvent. As the first conductive polymer or the organic alkali, those exemplified above can be used. The first liquid composition may also includes a dopant and/or another additional component as necessary.

The first liquid composition is, for example, a dispersion liquid (solution) including the first conductive polymer and the organic alkali. The first liquid composition may include a conductive polymer complex of the first conductive polymer with the dopant. Particles of the conductive polymer (or the conductive polymer complex) in the first liquid composition has an average particle size ranging, for example, from 5 nm to 800 nm, inclusive. The average particle size of the conductive polymer (or the conductive polymer complex) can be measured from, for example, particle size distribution by a dynamic light scattering method.

A content proportion of the organic alkali in the first liquid composition ranges preferably from 0.1% by mass to 10% by mass, inclusive, further preferably from 0.1% by mass to 5.0% by mass, inclusive. An equivalent of the organic alkali added to the first liquid composition ranges preferably from 0.4 times to twice, inclusive, further preferably from 0.5 times to 1.2 times, inclusive, a neutralization equivalent of the self-doped conductive polymer (or the conductive polymer complex containing the self-doped conductive polymer and the dopant). In this case, the withstand voltage characteristics is further improved, and the rise of the ESR in high-temperature environments is further suppressed.

A pH of the first liquid composition ranges preferably from 1.5 to 10, inclusive, more preferably from 2 to 10, inclusive, further preferably from 3 to 7, inclusive or from 4 to 6, inclusive. In this case, the withstand voltage characteristics is further improved, and the rise of the ESR in high-temperature environments is further suppressed. Additionally, corrosion of the dielectric layer is sufficiently suppressed.

Examples of the disperse medium (solvent) used for the first liquid composition include water, an organic solvent, and a mixture of water and an organic solvent. Examples of the organic solvent include monohydric alcohols such as methanol, ethanol and propanol, polyhydric alcohols such as ethylene glycol and glycerin, and aprotic polar solvents such as N,N-dimethylformamide, dimethylsulfoxide, acetonitrile, acetone, and benzonitrile.

The first liquid composition can be obtained by, for example, oxidatively polymerizing a precursor of the first conductive polymer in the disperse medium (solvent). Examples of this precursor include a monomer constituting the first conductive polymer and/or an oligomer in which some monomers are linked to each other. The first liquid composition containing the conductive polymer complex can be obtained by, for example, oxidatively polymerizing the precursor of the first conductive polymer in presence of the dopant in the disperse medium (solvent).

(Forming First Conductive Polymer Layer)

The first conductive polymer layer is formed by attaching the first liquid composition onto the dielectric layer. The step of forming first conductive polymer layer includes, for example, a step A of immersing, in the first liquid composition, the anode body on which the dielectric layer is formed, or applying or dropping the first liquid composition to the anode body on which the dielectric layer is formed, and then drying the first liquid composition. The step A may be repeated a plurality of times.

(Preparing Second Liquid Composition)

The second liquid composition includes the second conductive polymer or a precursor of the second conductive polymer, and a disperse medium (solvent) together with a dopant as necessary. As the second conductive polymer or the dopant, those exemplified above can be used. Examples of the precursor of the second conductive polymer include a monomer constituting the second conductive polymer and/or an oligomer in which some monomers are linked to each other. As the disperse medium (solvent), those exemplified for the first liquid composition can be used. The second liquid composition may further include an alkali and/or another component.

As the second liquid composition, for example, a dispersion liquid (solution) of the second conductive polymer or a dispersion liquid (solution) of a conductive polymer complex of the second conductive polymer with the dopant may be used. The second liquid composition may be prepared in accordance with a case of the first liquid composition.

The second conductive polymer layer may be formed by chemical polymerization or electrolytic polymerization. In the chemical polymerization, the second conductive polymer layer is formed using the second liquid composition containing, for example, the precursor of the second conductive polymer, the disperse medium (or the solvent), and an oxidant together with the dopant as necessary. In the electrolytic polymerization, the second conductive polymer layer is formed using the second liquid composition containing, for example, the precursor of the second conductive polymer and the disperse medium (or the solvent) together with the dopant as necessary.

(Forming Second Conductive Polymer Layer)

The second conductive polymer layer is formed by attaching the second liquid composition onto the first conductive polymer layer.

When the dispersion liquid (or the solution) containing the second conductive polymer is used as the second liquid composition, the step of forming the second conductive polymer layer includes, for example, a step B of immersing the first conductive polymer layer in the second liquid composition, or applying or dropping the second liquid composition onto the first conductive polymer layer, and then drying the second liquid composition. The step B may be repeated a plurality of times.

When the second conductive polymer layer is formed by the chemical polymerization, the step of forming the second conductive polymer layer includes a step C of immersing the first conductive polymer layer in the second liquid composition, or applying or dropping the second liquid composition onto the first conductive polymer layer, to attach the second liquid composition to the first conductive polymer layer, and then heating the second liquid composition. The heating promotes polymerization of the precursor of the second conductive polymer to form the second conductive polymer layer. The step C may be repeated a plurality of times.

When the second conductive polymer layer is formed by the electrolytic polymerization, the step of forming the second conductive polymer layer includes a step of immersing the first conductive polymer layer in the second liquid composition, and supplying power from a supply electrode by using the first conductive polymer layer as an electrode. This step promotes polymerization of the precursor of the second conductive polymer to form the second conductive polymer layer.

In both the forming methods, the second conductive polymer layer having a plurality of layers may be formed using a plurality of second liquid composition which have different compositions and/or different concentrations of solid component from each other, for example.

In order to form the second conductive polymer layer having a sufficient thickness, an average particle size of particles of the conductive polymer (or the conductive polymer complex) used in the second conductive polymer layer may be set larger than an average particle size of particles of the conductive polymer (or the conductive polymer complex) used in the first conductive polymer layer. For a similar purpose, the second liquid composition may be used that has a higher concentration of the conductive polymer (or the conductive polymer complex) than the first liquid composition. Further, for a similar purpose, the step B or C may be repeated in increased number of times. In the electrolytic polymerization, a period for supplying power may be prolonged or current may be increased.

(Forming Cathode Lead-Out Layer)

In this step, a cathode lead-out layer is formed by sequentially stacking a carbon layer and a silver paste layer on a surface of the anode body (preferably the solid electrolyte layer formed) obtained in the second step.

EXAMPLES

Hereinafter, the present invention is specifically described with reference to examples and comparative examples. The present invention, however, is not limited to the examples below.

Example 1

Electrolytic capacitor 1 shown in FIG. 1 was produced as described below, and characteristics of the electrolytic capacitor were evaluated.
(1) Preparing Anode Body An aluminum foil (thickness: 100 µm) was prepared as a base material, and a surface of the aluminum foil was etched to give anode body 6.
(2) Forming Dielectric Layer Anode body 6 was immersed in a 0.3% by mass solution of phosphoric acid (liquid temperature: 70° C.), and a DC (direct current) voltage of 70 V was applied for 20 minutes, to form dielectric layer 7 containing aluminum oxide ($Al_2O_3$) on a surface of anode body 6.

After that, an insulating resist tape (separation layer 13) was attached to a prescribed position of anode body 6.
(3) Preparing First Liquid Composition An aqueous dispersion liquid (first liquid composition) was prepared that contained a first conductive polymer and an organic alkali. A concentration of the first conductive polymer in the first liquid composition was 2% by mass, and an average particle size of the first conductive polymer was 50 nm. As the first conductive polymer, poly(3,4-ethylenedioxythiophene) having a sulfonate group directly bonded to a poly(3,4-ethylenedioxythiophene) skeleton was used. And as the organic alkali, diethylamine (DEA) was used. A concentration of the organic alkali in the first liquid composition was set at 0.2% by mass, and an equivalent of the organic alkali was set at 0.6 times a neutralization equivalent of the self-doing conductive polymer. A pH of the first liquid composition was 2.0.
(4) Forming First Conductive Polymer Layer A step of immersing anode body 6 on which dielectric layer 7 had been formed in the first liquid composition, and then drying the first liquid composition at 120° C. for 10 minutes to 30 minutes was repeated twice to form a first conductive polymer layer.
(5) Forming Second Conductive Polymer Layer An aqueous dispersion liquid (second liquid composition) that contained a second conductive polymer, a dopant, and an organic alkali was prepared. Specifically, the second liquid composition was prepared by adding DEA to an aqueous PEDOT/PSS dispersion liquid (concentration of PEDOT/PSS particles: 2% by mass, average particle size of PEDOT/PSS particles: 400 nm). A concentration of the organic alkali in the second liquid composition was set at 0.3% by mass.

A step of immersing the anode body on which the first conductive polymer layer had been formed in the second liquid composition, and then drying the second liquid composition at 120° C. for 10 minutes to 30 minutes was repeated 4 times to form a second conductive polymer layer.

In this manner, solid electrolyte layer 9 including the first conductive polymer layer and the second conductive polymer layer was formed.
(6) Forming Cathode Lead-Out Layer A dispersion liquid obtained by dispersing graphite particles in water was applied to a surface of solid electrolyte layer 9, and was then dried in air to form carbon layer 11 on a surface of the second conductive polymer layer.

Next, a silver paste containing silver particles and a binder resin (epoxy resin) was applied to a surface of carbon layer 11, and then the binder resin was cured by heating to form silver paste layer 12. In this manner, cathode lead-out layer 10 including carbon layer 11 and silver paste layer 12 was formed. In this manner, capacitor element 2 was obtained.
(7) Assembling of Electrolytic Capacitor Capacitor element 2, and anode terminal 4, cathode terminal 5, and adhesive layer 14 disposed on the capacitor element were sealed with resin sealing member 3 to produce an electrolytic capacitor.

Example 2

The concentration of the organic alkali in the first liquid composition was set at 0.4% by mass, and the equivalent of the organic alkali was set at 1.0 time the neutralization equivalent of the self-doing conductive polymer. A pH of the first liquid composition was 4.2. Except for these changes, the first liquid composition was prepared similarly to Example 1, and an electrolytic capacitor was produced.

Example 3

Triethylamine (TEA) was used as the organic alkali, the concentration of the organic alkali in the first liquid composition was set at 0.3% by mass, and the equivalent of the organic alkali was set at 0.6 times the neutralization equivalent of the self-doing conductive polymer. A pH of the first liquid composition was 2.2. Except for these changes, the first liquid composition was prepared similarly to Example 1, and an electrolytic capacitor was produced.

Example 4

The concentration of the organic alkali in the first liquid composition was set at 0.6% by mass, and the equivalent of the organic alkali was set at 1.0 time the neutralization equivalent of the self-doing conductive polymer. A pH of the first liquid composition was 4.4. Except for these changes, the first liquid composition was prepared similarly to Example 3, and an electrolytic capacitor was produced.

Comparative Example 1

No organic alkali was added to the first liquid composition. A pH of the first liquid composition was 1.4. Except for these changes, the first liquid composition was prepared similarly to Example 1, and an electrolytic capacitor was produced.

Comparative Example 2

Ammonia was used in place of the organic alkali, a concentration of ammonia in the first liquid composition was set at 0.05% by mass, and an equivalent of ammonia was set at 0.6 times the neutralization equivalent of the self-doped conductive polymer. A pH of the first liquid composition was 2.2. Except for these changes, the first liquid composition was prepared similarly to Example 1, and an electrolytic capacitor was produced.

Comparative Example 3

The concentration of ammonia in the first liquid composition was set at 0.1% by mass, and the equivalent of ammonia was set at 1.0 time the neutralization equivalent of the self-doped conductive polymer. A pH of the first liquid composition was 4.4. Except for these changes, the first liquid composition was prepared similarly to Comparative Example 2, and an electrolytic capacitor was produced.

[Evaluation]

The electrolytic capacitors of the examples and the comparative examples were evaluated as follows.

(a) Measurement of ESR

As an initial ESR value, an ESR value (mΩ) at a frequency of 100 kHz of the electrolytic capacitor was measured, in an environment of 20° C., using an LCR meter for 4-terminal measurement. Further, in order to evaluate stability of ESR in high-temperature environments, a rated voltage was applied to the electrolytic capacitor at a temperature of 145° C. for 250 hours, and then an ESR value (mΩ) was measured as heat-resistance ESR by the same method as described above.

The initial ESR and the heat-resistance ESR in each of the examples and the comparative examples were evaluated based on a ratio to the initial ESR of Comparative Example 1 and a ratio to the heat-resistance ESR of Comparative Example 1, respectively when each of the initial ESR and the heat-resistance ESR in Comparative Example 1 was defined as 100.

(b) Withstand Voltage Characteristics

A voltage applying the electrolytic capacitor was increased at a rate of 1 V/s, and a voltage value (V) was measured at a time when a current value exceeded 0.5 A. The measured voltage value was converted into a relative value when a voltage value in Comparative Example 1 was defined as 100. And the relative value was used as an evaluation index for withstand voltage characteristics. A larger relative value indicates higher withstand voltage characteristics.

Table 1 shows evaluation results. A1 to A4 denote Examples 1 to 4, and B1 to B3 denote Comparative Examples 1 to 3.

TABLE 1

| | pH of first liquid composition | Initial ESR | Heat-resistance ESR | Withstand voltage characteristics |
|---|---|---|---|---|
| A1 | 2.0 | 65.7 | 42.0 | 109.5 |
| A2 | 4.2 | 60.0 | 29.0 | 121.2 |
| A3 | 2.2 | 67.4 | 45.0 | 107.4 |
| A4 | 4.4 | 62.1 | 32.2 | 120.3 |
| B1 | 1.4 | 100.0 | 100.0 | 100.0 |
| B2 | 2.2 | 85.3 | 72.2 | 103.6 |
| B3 | 4.4 | 74.4 | 57.1 | 120.5 |

An electrolytic capacitor according to the present invention is usable for various applications in which a low ESR in high-temperature environments is required to be maintained.

The invention claimed is:

1. An electrolytic capacitor comprising:
   an anode body;
   a dielectric layer disposed on the anode body; and
   a solid electrolyte layer disposed on the dielectric layer, wherein:
   the solid electrolyte layer includes a first conductive polymer layer and a second conductive polymer layer disposed on the first conductive polymer layer,
   the first conductive polymer layer includes a self-doped conductive polymer and a first organic alkali,
   the first organic alkali is distributed in an entirety of the first conductive polymer layer, and
   the second conductive polymer layer includes a non-self-doped conductive polymer and a second organic alkali.

2. The electrolytic capacitor according to claim 1, wherein the self-doped conductive polymer is at least one selected from the group consisting of a self-doped poly(3,4-ethylenedioxythiophene)-conductive polymer and a self-doped poly(isothianaphthene)-based conductive polymer.

3. The electrolytic capacitor according to claim 1, wherein the self-doped conductive polymer has a sulfonate group or a salt of the sulfonate group.

4. The electrolytic capacitor according to claim 1, wherein the first organic alkali is an amine compound.

5. A method for manufacturing an electrolytic capacitor, the method comprising:
   preparing an anode body on which a dielectric layer is formed;
   preparing a first liquid composition, the first liquid composition including a self-doped conductive polymer and a first organic alkali;
   forming a first conductive polymer layer by attaching the first liquid composition onto the dielectric layer, the first conductive polymer layer including the self-doped conductive polymer and the first organic alkali;
   preparing a second liquid composition, the second liquid composition including a non-self-doped conductive polymer and a second organic alkali; and
   forming a second conductive polymer layer by attaching the second liquid composition onto the first conductive polymer layer, the second conductive polymer layer including the non-self-doped conductive polymer and the second organic alkali,
   wherein in the forming of the first conductive polymer layer, the first organic alkali is distributed in an entirety of the first conductive polymer layer.

6. The method for manufacturing an electrolytic capacitor according to claim 5, wherein a content proportion of the first organic alkali in the first liquid composition ranges from 0.1% by mass to 5.0% by mass, inclusive.

7. The method for manufacturing an electrolytic capacitor according to claim 5, wherein a pH of the first liquid composition ranges from 1.5 to 10, inclusive.

* * * * *